United States Patent Office 3,552,995
Patented Jan. 5, 1971

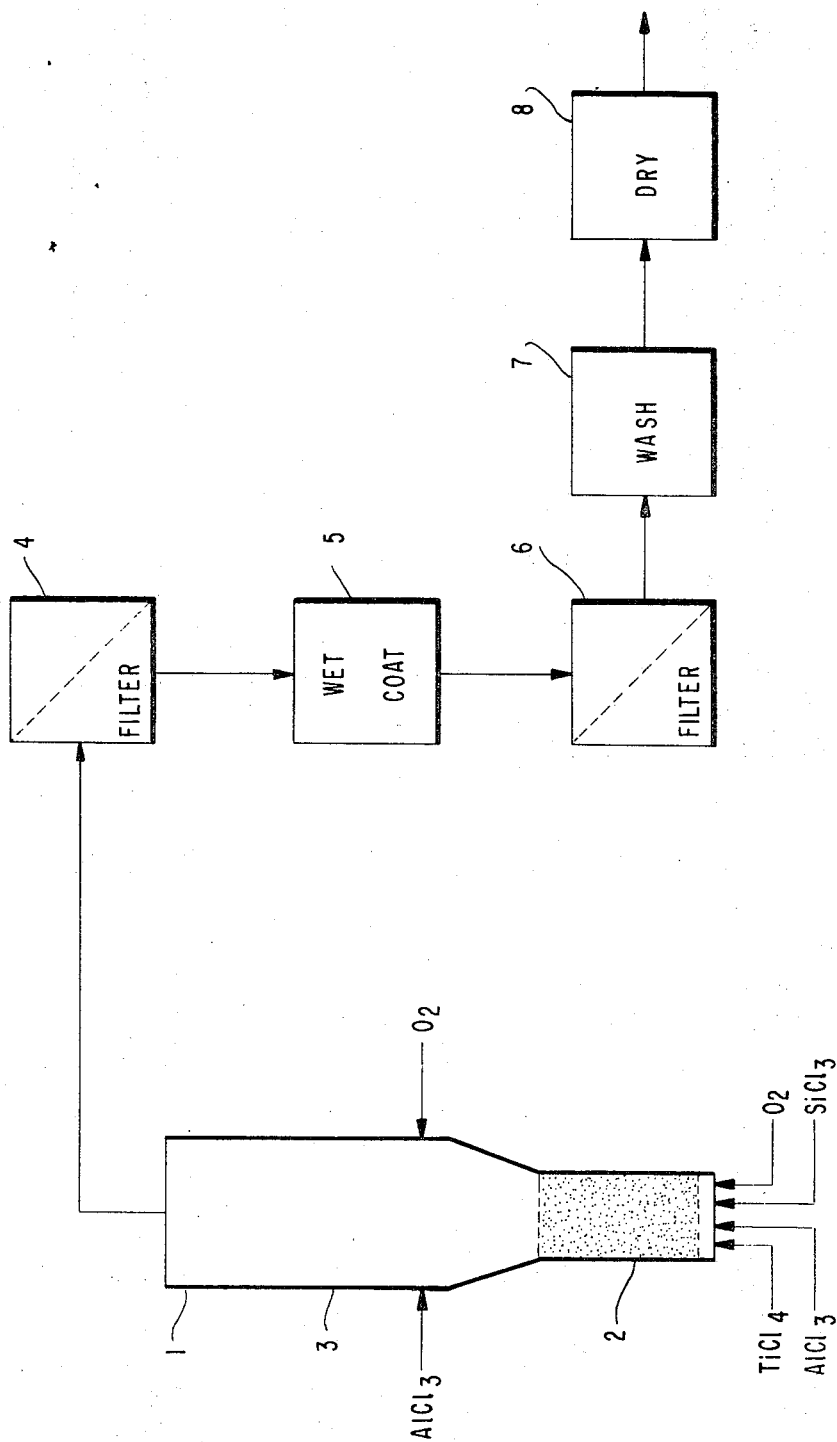

3,552,995
PRODUCTION OF COATED TITANIUM DIOXIDE PARTICLES
Stanley Powell, Acklam, Middlesbrough, England, assignor to British Titan Products Company Limited, Billingham, England, a corporation of England
Filed July 10, 1968, Ser. No. 743,605
Claims priority, application Great Britain, July 11, 1967, 31,870/67
Int. Cl. C09c 1/36; B44d 1/16
U.S. Cl. 117—69
19 Claims

ABSTRACT OF THE DISCLOSURE

A process for the production of coated metal oxide particles comprising oxidising a metal halide in the vapour phase to provide a suspension of starting metal oxide particles in a hot gas stream, introducing a different metal halide into the gas stream to dry coat a different metal oxide on the particles, recovering the dry coated metal oxide particles from the gas stream and subjecting them to a wet coating process.

---

The present invention relates to the production of coated metal oxide particles, for example coated titanium dioxide particles.

It is an object of the invention to provide pigmentary particles which show improved durability and/or gloss retention when incorporated into coating compositions.

According to the present invention, a process for the production of coated metal oxide particles comprises oxidising a metal halide in the vapour phase to provide a suspension of metal oxide particles (hereinafter termed "starting metal oxide particles") in a hot gas stream, introducing a different metal halide into the gas stream to dry coat a different metal oxide on the particles, recovering the dry coated metal oxide particles from the gas stream and subjecting them to a wet coating process.

The terms "metal halide" and "metal oxide" used in this specification include halides and oxides of silicon and the terms "dry coat" or "dry coated" mean that there is or has been deposited upon the starting metal oxide particles in the dry state one or more layers of metal oxide(s) derived from the metal halide(s) introduced into the said hot gas stream. At least one of the dry coating layers is of a different metal oxide from that of the starting metal oxide particles.

The suspension of starting metal oxide particles in the hot gas stream is provided by the oxidation of a metal halide in the vapour phase. This oxidation may be a true oxidation step using, for example, oxygen or air as the oxidising gas and producing the free halogen from the halide or the metal halide may be oxidised by hydrolysis, for example, by steam, wherein the corresponding hydrogen halide is produced.

The vapour phase oxidation of the metal halide to produce the starting metal oxide particles may be carried out, for example, in a fluidised bed of inert particles, or in a burner. Alternatively, one may use the plasma process described and claimed in British specification No. 1,035,-191 or the so-called "cascade" method described and claimed in British specification No. 991,318. The latter is described hereinafter in more detail.

The process may also be carried out in such a manner as to control the average particle size of the starting metal oxide particles. This control may, for example, be effected by carrying out the oxidation in the presence of a source of Group I-A elements such as potassium, rubidium and/or caesium, particularly a potassium compound. Another method of limiting the size of the starting metal oxide particles is to carry out the oxidation in the presence of excess oxygen. In addition, aluminium and silicon halides such as the chlorides or bromides may be introduced into the reactants forming the starting particles, to control crystal structure and aggregation (to be distinguished from the subsequent addition of halides to form coatings).

The dry coating(s) of metal oxide(s) may be applied by oxidising the metal halides (by the simultaneous introduction of an oxidising gas or by means of oxidising gas already present in the hot gas stream) or it may be applied by the reaction of the metal halide(s) with the surface of the metal oxide particle whereby an exchange reaction takes place to form the metal oxide(s) coating on the particle and a gaseous metal halide derived from the surface of the metal oxide particle. The latter halide may, if desired, be oxidised to form another coating of metal oxide on the particles or it may be recovered with the other gases after the metal oxide particles have been separated from the gas stream. The temperature of the hot gas stream will be that appropriate for the particular type of reaction chosen for producing the dry coating(s).

Examples of metal oxides which may be applied as dry coatings in the present process are alumina, silica, titania, and/or zirconia. Where titania is applied to pigmentary titanium dioxide particles it should normally be applied after another oxide coating, or concurrently therewith. Of the oxides mentioned above alumina is the preferred coating, with or without other oxides, when the starting metal oxide particles consist of pigmentary titanium dioxide.

As mentioned above, starting metal oxide particles may be produced by the "cascade" process of British specification No. 991,318. This process comprises passing into a reaction zone a stream of hot gas containing initial solid particles of smaller average particle size than that of the metal oxide to be produced, and introducing into the reaction zone a metal halide and an oxygenating gas, at least one of these reactants being introduced through a plurality of inlets spaced along the length of the zone in the direction of the gas flow. By this means, there is provided a series of oxidation reactions along the length of the reaction zone, the metal oxide formed in each reaction building up sequentially on the initial solid particles till the desired particle size is reached.

After the desired amount of metal oxide has been formed in the reaction zone upon the initial particles to provide metal oxide particles of the desired size, one or more dry coatings of a metal oxide(s) may then be applied by introducing into the hot gaseous suspension the appropriate metal halide(s) with or without an oxidising gas as required.

Where more than one such coating metal halide is to be introduced the points of introduction can conveniently be spaced apart either in the reaction zone or at some point(s) between this and the recovering of the metal oxide particles from the gas stream.

The dry coated metal oxide particles (however produced) may be recovered from the gas stream by any suitable method, for example, by passing the gaseous suspension through filters or by electrostatic precipitates or by passage through a water scrubber thus producing an aqueous slurry of metal oxide which can be used in the wet coating process.

The gas remaining after the removal of the metal oxide particles normally contains the halogen derived from the oxidation or the metal halide and this can be recovered, for example, by liquefaction, and re-used.

The dry coated particles, after separation from the gas stream, are then subjected to a wet coating process whereby there is deposited one or more coatings of a hydrous metal oxide or a phosphate. The metal oxide may, for example, be hydrous alumina, titania, ceria, zirconia and/ or silica. The phosphate is preferably a water-insoluble phosphate of one or more of the metals which can be present as a hydrous oxide.

The wet coating is normally applied by mixing an aqueous suspension of the dry coated metal oxide particles and a water-soluble metal-containing compound from which the hydrous metal oxide can be precipitated by an appropriate adjustment of the pH value of the mixture. Where a phosphate is applied this may be done by adding to the aqueous suspension of metal oxide particles a water-soluble metal compound and a water-soluble phosphate or phosphoric acid thereby forming, by double decomposition, a water-insoluble metal phosphate as a coating on the metal oxide particles.

Water-soluble metal-containing compounds which have been found effective are the sulphates, chlorides and, in the case of aluminium, alkali metal aluminates.

The metal oxide coatings (whether applied from the vapour phase as a dry coating or by a wet process) preferably constitute 0.5% to 7%, preferably 1% to 5%, by weight (expressed as the anhydrous metal oxide) of the coated particle in the case of alumina, titania, zirconia, and/or ceria and 0.5% to 15% for silica. A preferred amount of phosphate in the coating is one in the range 0.3% to 3% (expressed as $P_2O_5$).

It has been found that the process of the present invention produces pigments which, when incorporated into surface coating compositions, show improved durability and gloss retention when compared with compositions containing similar pigments having a similar quantity of coating applied only by a dry coating process or of a coating applied only by a wet process.

The attached figure represents one process flow chart that can be used in the practice of this invention. Reactor 1 comprises a lower fluidized bed 2 and an upper reaction chamber 3. Titanium tetrachloride and oxygen are introduced into the lower portion of reactor 1 to form titanium dioxide particles. Aluminum trichloride and silicon trichloride may also be introduced in the lower portion of the bed to act as nuclei, or the like, for the titanium dioxide particles. Titanium dioxide particles are formed in fluidized bed 2 and then pass upward into reaction chamber 3 wherein a dry coating is effected. As shown, aluminum trichloride and oxygen may be introduced into reaction chamber 3 to provide an aluminum oxide coating on the titanium dioxide particles. As indicated earlier in the specification, some titanium tetrachloride may also be introduced with the aluminum trichloride in reaction chamber 3, if desired.

The dry coated particles are passed to filter 4 wherein the particles are removed from the gas stream. The particles then are wet coated in vessel 5 and the twice-coated particles are filtered in filter 6 to separate the particles from the aqueous medium. Thereafter, the particles may be washed in wash tank 7 and dried in oven 8. If desired, the particles finally may be milled, such as by fluid energy milling with air.

The invention is illustrated in the following example.

EXAMPLE

This example illustrates the preparation of pigmentary titanium dioxide by the process of the invention.

The apparatus in which the vapour phase reaction took place consisted of a silica tube 4 feet long, arranged vertically in an electric furnace, the bottom 12 inches of the tube had a diameter of 3 inches and the remainder had a diameter of 4 inches. The base of the tube was sealed with a base plate through which provision was made for the injection of titanium tetrachloride, oxygen, silicon tetrachloride and aluminium chloride into the tube. In the lower portion of the tube was a bed of 1 kg. of titanium dioxide particles having diameter within the range 210–350μ maintained at 1100° C. by the furnace. The following materials were passed through the base plate to fluidise the bed and to form the initial solid particles of titanium dioxide.

.5 gr. moles per minute of titanium tetrachloride as vapour 2.25 gr. moles per minute of oxygen with additions of aluminium chloride and silicon tetrachloride to provide 2.7% alumina and 0.12% silica on the titanium dioxide thus produced. 60% of the titanium dioxide produced left the bed in the gas stream. In the 4 inch diameter section of the pipe and 15 inches above the base, 0.75 gr. mole per minute titanium tetrachloride, 0.25 gr. mole per minute oxygen and aluminium chloride equivalent to 1.6% alumina on the titanium dioxide were introduced into the hot gas stream containing the initial particles of titanium dioxide to provide a dry coating thereon.

The reaction zone in the silica tube at the point of injection of the dry coating reactants was maintained approximately at a temperature of 1100–1150° C.

The product which left the reactor in the gas stream was collected on a glass cloth filter. The product obtained consisted of titanium dioxide particles having a mean particle size of 0.23 microns; 98.8% of the titanium dioxide present was in the rutile form. The product contained 2.1% alumina and 0.06% silica based on the weight of titanium dioxide.

A portion of this pigment was slurried in distilled water at a concentrtion of 250 g.p.l. Sodium hydroxide solution was added to raise the pH to 9.5. The slurry was heated to 50° C. and aluminium sulphate solution equivalent to 2½% $Al_2O_3$ on the pigment was added. Sodium hydroxide solution was then added again to raise the pH to 8.5. The slurry was cooled, the pigment filtered out, washed with clean water and dried in an oven at 120° C. The pigment now contained a total of 4.6% alumina.

This pigment was fluid energy milled with air.

The pigment was used to prepare a soya-alkyd resin based paint which was tested to determine the pigment properties. Panels were prepared and exposed in an accelerating Marr Weatherometer for a total of 1500 hours. At the same time, control panels prepared from a similar paint base but containing a conventional wet coated titanium dioxide pigment produced by the sulphate process were also placed in the Weatherometer. This pigment was a rutile pigment having a coating consisting of a hydrous oxide of titanium in an amount expressed as $TiO_2$ of 1.5% and a hydrous oxide of aluminium in an amount when expressed as $Al_2O_3$ of 2.0%, both being by weight of $TiO_2$ in the particles.

The Durability Ratio, which is the ratio of the rate of weight loss of the test panel relative to the rate of weight loss of the control panel, under test, was 0.57. The gloss of the exposed panels was also measured on a Hunterlab gloss meter. The samples containing the pigment prepared according to the present invention gave a mean gloss value of 48 which varied by less than 10% throughout the exposure period. In contrast, the control panel showed gloss values starting at 36 and falling to the very low level of about 1. Paints containing most commercial pigments now available have this characteristic fall-off in gloss over the exposure time and clearly, and therefore, the retention of gloss exhibited by the present pigment is quite remarkable.

Samples of paints having the same resin base as used previously in this example were prepared which contained a pigment which had been prepared by the vapour phase oxidation of titanium tetrachloride and dry-coated with an amount of alumina similar to the total amount of alumina applied in a very similar manner to that already described but without a subsequent wet-coating to give a pigment containing a total of 4.1% aluminium oxide based on $TiO_2$. When these panels were exposed in the Weatherometer in a similar manner to that previously described, the Durability Ratio was 0.98 and the gloss of the panels fell from an initial value of 50 to a final value of approximately 20. This illustrates the improvement obtained by the method of the present invention over a pigment which had been coated with aluminium oxide in the vapour phase but without a subsequent wet coating treatment.

Another pigment prepared by vapour phase oxidation of titanium tetrachloride in the manner described in this example but without further dry addition of aluminium chloride was subsequently wet coated to give a coating of a hydrous oxide of aluminium in an amount of 4.5% by weight expressed as $Al_2O_3$. Paint prepared from this pigment in the same resin base as used previously was exposed in the weatherometer and the Durability Ratio was 0.97. The gloss of the panels fell from an initial value of 62 to 15, again illustrating the advantage of the present invention over a pigment prepared by vapour phase oxidation with subsequent wet coating treatment but without intervening vapour phase coating treatment.

The pigment produced according to the present invention had a tinting strength on the Reynolds scale of 1800 as compared with the dry-coated pigment without subsequent wet-coating, which had a tinting strength of 1780 on the Reynolds scale. The tinting strength of the sulphate process pigment wet-coated with alumina was 1700. The tinting strength of another pigment prepared by the oxidation of titanium tetrahalide but without further dry addition of aluminium chloride and with a subsequent alumina wet coating treatment was 1780. It will be seen that the introduction of alumina during the production of the titanium dioxide pigment and by a wet coating process did not reduce the tinting strength.

What is claimed is:

1. A process for the production of coated titanium dioxide particles comprising oxidizing titanium tetrachloride in the vapour phase to provide a suspension of titanium dioxide particles in a hot gas stream, introducing a metal halide selected from the group consisting of aluminum, silicon and zirconium halides into the hot gas stream containing titanium dioxide particles to dry coat the titanium dioxide particles with a first coating containing an oxide of a metal selected from the group consisting of aluminum, silicon and zirconium, recovering the dry coated titanium dioxide particles from the gas stream and wet coating said particles to provide a second coating thereon containing a compound selected from the group consisting of hydrous oxides and phosphates of aluminum, titanium, cerium, zirconium and silicon.

2. A process as claimed in claim 1 wherein the particles are dry coated with a plurality of metal oxides.

3. A process as claimed in claim 1 wherein the first metal oxide coating, expressed as the anhydrous metal oxide, constitutes 0.5% to 7% by weight of the coated particle.

4. A process as claimed in claim 3 wherein the range is 1% to 5%.

5. A process as claimed in claim 1 wherein the particles are dry coated with silica.

6. A process as claimed in claim 5 wherein the silica coating constitutes 0.5% to 15% by weight, expressed as anhydrous silica, of the coated particle.

7. A process as claimed in claim 1 wherein the titanium dioxide particles are pigmentary.

8. A process as claimed in claim 7 wherein the particles are dry coated with alumina and thereafter dry coated with titania.

9. A process as claimed in claim 7 wherein the particles are dry coated concurrently with alumina and with titania.

10. A process as claimed in claim 1 wherein an oxidising gas is also introduced into the gas stream.

11. A process as claimed in claim 1 wherein the wet coating process comprises mixing an aqueous suspension of the dry coated metal oxide particles with a water-soluble metal-containing compound and adjusting the pH value of the mixture to precipitate the metal oxide as a wet coating onto the particles.

12. A process as claimed in claim 1 wherein the wet coating process comprises mixing an aqueous suspension of the dry coated metal oxide particles with a water-soluble metal compound and a compound selected from the group consisting of a water-soluble phosphate and phosphoric acid to form a water-insoluble metal phosphate as a wet coating on the particles.

13. A process as claimed in claim 11 wherein the wet coating is of a metal oxide selected from the group consisting of alumina, titania, ceria and zirconia.

14. A process as claimed in claim 13 wherein the wet coating of metal oxide, expressed as the anhydrous metal oxide, constitutes 0.5% to 7% by weight of the coated particle.

15. A process as claimed in claim 14 wherein the range is 1% to 5%.

16. A process as claimed in claim 11 wherein the wet coating is of silica.

17. A process as claimed in claim 16 wherein the wet coating of silica constitutes 0.5% to 15% by weight of the coated particle.

18. A process as claimed in claim 12 wherein the metal phosphate coating, expressed as $P_2O_5$, constitutes 0.3% to 3% by weight of the coated particle.

19. A process as claimed in claim 1 wherein the titanium dioxide is dry coated with a first coating containing aluminum oxide and thereafter is wet coated to provide a second coating containing aluminum oxide.

References Cited

UNITED STATES PATENTS

| | | | |
|---|---|---|---|
| 2,780,558 | 2/1957 | Wilcox | 117—100 |
| 2,798,819 | 7/1957 | Schaumann | 106—300 |
| 3,068,113 | 12/1962 | Strain et al. | 106—300 |
| 3,127,280 | 3/1964 | Whately | 106—308X |
| 3,169,074 | 2/1965 | Holbein | 106—300 |
| 3,172,772 | 3/1965 | Rowe | 106—300 |
| 3,180,741 | 4/1965 | Wainer et al. | 106—300X |
| 3,212,911 | 10/1965 | Berstein et al. | 106—300 |
| 3,245,818 | 4/1966 | Evans et al. | 106—300 |
| 3,418,147 | 12/1968 | Fields | 106—300 |

FOREIGN PATENTS 944,292 12/1963 Great Britain _____ 106—300

WILLIAM D. MARTIN, Primary Examiner

M. R. P. PERRONE, Jr., Assistant Examiner

U.S. Cl. X.R.

106—300, 308; 117—100